(12) United States Patent
Won

(10) Patent No.: US 7,674,325 B2
(45) Date of Patent: Mar. 9, 2010

(54) SOLVENT USE AND REGENERATION

(75) Inventor: Ray Won, San Clemente, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 944 days.

(21) Appl. No.: 10/563,548

(22) PCT Filed: Sep. 9, 2003

(86) PCT No.: PCT/US03/28187

§ 371 (c)(1),
(2), (4) Date: Jun. 8, 2006

(87) PCT Pub. No.: WO2005/035101

PCT Pub. Date: Apr. 21, 2005

(65) Prior Publication Data

US 2006/0266214 A1    Nov. 30, 2006

(51) Int. Cl.
*B01D 53/14* (2006.01)
(52) U.S. Cl. ............... 96/234; 95/160; 95/163; 95/164; 95/204; 95/235; 95/236
(58) Field of Classification Search ........... 95/204, 95/158–160, 163–164, 169, 172, 176–177, 95/191–192, 207–208, 235–236; 96/234
See application file for complete search history.

(56) References Cited

U.S. PATENT DOCUMENTS 3,594,985 A * 7/1971 Ameen et al. ............ 95/163
6,139,605 A * 10/2000 Carnell et al. ............ 95/164
7,424,808 B2 * 9/2008 Mak, John ............... 62/625
2004/0003717 A1 * 1/2004 Gaskin .................... 95/176
2005/0172807 A1 * 8/2005 Mak ........................ 95/235

FOREIGN PATENT DOCUMENTS

| DE | 3248585 | 7/1983 |
|---|---|---|
| GB | 02167397 | 5/1986 |
| WO | 2004085036 | 10/2004 |

* cited by examiner

*Primary Examiner*—Duane Smith
*Assistant Examiner*—Ives Wu
(74) *Attorney, Agent, or Firm*—Fish & Associates PC

(57) ABSTRACT

An absorber (110) in a gas treatment plant (100) produces a rich solvent (116) that is flashed to produce flashed rich solvent (134D) and recycle gas (132D), wherein the recycle gas (132D) is not mixed with the absorber feed gas (112) as commonly practiced, but mixed with the rich solvent (116). Such configurations exhibit superior rich solvent loading, thereby reducing solvent circulation. Further contemplated gas treatment plants (100)may also include a regenerator (150) in which carbon dioxide from atmospheric flashed vapor (142) of the rich solvent (144) is employed as a stripping gas in a regenerator (150) to strip hydrogen sulfide from the rich solvent (144), and wherein sweet gas (114) is employed to strip the carbon dioxide from the rich solvent (144).

17 Claims, 1 Drawing Sheet

US 7,674,325 B2

SOLVENT USE AND REGENERATION

FIELD OF THE INVENTION

The field of the invention is treatment of gases, and especially as it relates to solvent-based acid gas removal from various feed gases.

BACKGROUND OF THE INVENTION

Acid gas removal from various gas streams, and especially removal of carbon dioxide, sulfur dioxide, and hydrogen sulfide from natural gas streams has become increasingly important as regulations for emission of acid gases have become more and more stringent. There are numerous processes for acid gas removal known in the art, and physical solvents are often preferred where feed gas pressures are relatively high (i.e., above 200 psig). The physical absorption of a particular acid gas predominantly depends upon use of solvents having selective solubility for the acid gas (e.g., $CO_2$, or $H_2S$), and is typically further dependent upon pressure and temperature of the solvent and raw gas.

For example, methanol may be employed as a low-boiling organic physical solvent, as exemplified in U.S. Pat. No. 2,863,527. However, the energy input requirements for cooling are relatively high, and the process generally exhibits greater than desired methane and methane absorption, thereby necessitating large energy inputs for recompression and recovery. Alternatively, physical solvents may be operated at ambient or slightly below ambient temperatures, including propylene carbonates as described in U.S. Pat. No. 2,926,751 and those using N-methylpyrrolidone or glycol ethers as described in U.S. Pat. No. 3,505,784. While such solvents may advantageously reduce cooling requirements, at least some of the propylene carbonate-based absorption processes are limited to absorption pressures of less than 1,000 psi (i.e., to sub-critical pressure). In further known methods, physical solvents may also include ethers of polyethylene glycol dimethylethers, and specifically dimethoxytetraethylene glycol as shown in U.S. Pat. No. 2,649,166, or N-substituted morpholine as described in U.S. Pat. No. 3,773,896.

While use of physical solvents avoids at least some of the problems associated with alternative acid gas removal processes (e.g., chemical solvents and/or membranes), various difficulties generally persist. Among other things, as the water content in the solvent increases, freezing may occur in the solvent circuit, thus necessitating a relatively high operating temperature and thereby reducing the efficiency of the absorption process. Furthermore, regeneration of physical solvents requires in many instances steam or external heat to produce a lean solvent suitable for removal of acid gas to the ppm level. Such solvent regeneration is conceptually relatively simple. Typically, rich solvent is successively flashed to lower pressures, and in many instances, further processed in a regenerator that heats the flashed solvent using a steam or fuel fired heater. The so generated heated lean solvent is then cooled (e.g., using external refrigeration) and pumped to the absorber.

In such processes, as carbon dioxide is absorbed by the solvent, the heat of solution of carbon dioxide increases the solvent temperature resulting in a top-to-bottom increasing temperature profile across the absorber. Consequently, one limitation of physical absorption lies in the relatively high absorber bottom temperature, which limits carbon dioxide absorption capacity of the solvent. To overcome the problems associated with limited absorption capacity, the solvent circulation rate may be increased. However, increase in solvent circulation significantly increases refrigeration costs and energy consumption for pumping the solvent. Worse yet, high solvent circulation of known solvent processes will lead to increased loss of methane and hydrocarbons (due to co-absorption).

Alternatively, a stripping column (optionally equipped with a vacuum pump) may be employed as a regenerator for the solvent, as exemplified in an acid gas removal plant shown in U.S. Pat. No. 3,252,269 to Woertz. While such systems often reduce the energy demands for heating, operation of the stripper nevertheless requires some energy (e.g., vacuum pump for vacuum stripper, or heater for atmospheric stripper).

Thus, although there are numerous processes for acid gas removal with physical solvents known in the art, all or almost all of them suffer one or more disadvantages. Most significantly, in numerous known systems, the solvent circulation rate is relatively high, among other factors, due to sub-optimal solvent loading and sub-optimal stripping. Therefore, there is still a need for improved configurations and methods for acid gas removal from a feed gas using a physical solvent.

SUMMARY OF THE INVENTION

The present invention is directed to configurations and methods of acid gas removal from various feed gases in which a physical solvent is employed to absorb the acid gases, and in which recycle gas from rich solvent flashing is mixed with the rich solvent generated in the absorber, thereby significantly improving solvent loading, which in turn significantly reduces the solvent circulation rate. Additionally or optionally, regeneration of the lean solvent may be performed in a vacuum stripper in which a portion of atmospheric flash vapor is employed to strip hydrogen sulfide from the rich solvent, while a portion of sweet gas is separately fed to the stripper to strip carbon dioxide from the rich solvent.

Thus, in one aspect of the inventive subject matter, contemplated gas treatment plants will include an absorber in which acid gas is removed from a feed gas (e.g., natural gas at a pressure of at least 2,000 psig to as high as 3000 psig, comprising carbon dioxide and/or hydrogen sulfide) using a physical solvent to produce a rich solvent, wherein the rich solvent is contacted with a recycle gas that is produced from the rich solvent. The recycle gas in particularly preferred plants is produced from flashed gases of a plurality of serially coupled flash vessels, wherein the recycle gas is compressed to absorber pressure, and rich solvent is preferably flashed in a flash vessel in a series of flash vessels to produce an atmospheric flashed rich solvent that is fed into a vacuum stripper to produce a lean solvent.

In further preferred aspects of contemplated plants, the vacuum stripper separately receives as a stripping gas the sweet gas produced by the absorber and atmospheric flashed gas from the flash vessel. It should further be appreciated that the rich solvent is contacted with the recycle gas in the bottom portion of the absorber. Alternatively, the rich solvent is contacted with the recycle gas in a static mixer outside the absorber.

Consequently, viewed from another perspective, contemplated gas treatment plants may comprise a contact vessel in which a rich solvent from an absorber contacts a recycle gas, wherein the recycle gas is produced from the rich solvent, and wherein the absorber receives a feed gas from which an acid gas is removed using a physical solvent, thereby producing the rich solvent. The contact vessel in such plants advantageously comprises a static mixer, wherein the contact vessel may further be fluidly coupled to a flash vessel. The rich solvent in such plants is preferably flashed downstream of the contact vessel in a plurality of sequentially coupled flash vessels, wherein each of the flash vessels produces a portion of the recycle gas.

Additionally, at least one of the flash vessels may produce an atmospheric flash gas and a flashed rich solvent that is fed into a regenerator to produce a lean solvent for the absorber. The absorber in contemplated configurations will therefore produce a sweet gas, wherein at least a portion of the sweet gas and at least a portion of the atmospheric flash gas are separately fed into the regenerator as stripping gases. Especially preferred regenerators are configured such that carbon dioxide in the carbon dioxide-rich atmospheric flash gas strips hydrogen sulfide from the flashed rich solvent, and that at least a portion of the sweet gas strips the carbon dioxide from the flashed rich solvent.

Therefore, as viewed from yet another perspective, contemplated gas treatment plants may include a flash vessel that produces an atmospheric flash gas comprising a first acid gas and a flashed rich solvent comprising a second acid gas, and a vacuum stripper that is fluidly coupled to the flash vessel and produces a lean solvent from the flashed rich solvent, wherein the atmospheric flash gas and sweet gas produced by the absorber are fed into the vacuum stripper at a position such that the first acid gas (e.g., carbon dioxide) strips the second acid gas (e.g., hydrogen sulfide) from the flashed rich solvent and the sweet gas strips the first acid gas from the rich solvent.

The flash vessel in such plants may advantageously receive a rich solvent from an absorber, wherein the rich solvent is contacted with a recycling gas before the rich solvent enters the flash vessel. The recycling gas is preferably produced in another flash vessel that is upstream fluidly coupled of flash vessel and downstream fluidly coupled to the absorber (e.g., by combination of the high and medium pressure flash gases). Suitable plants may further include a contact vessel in which the rich solvent contacts the recycling gas.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
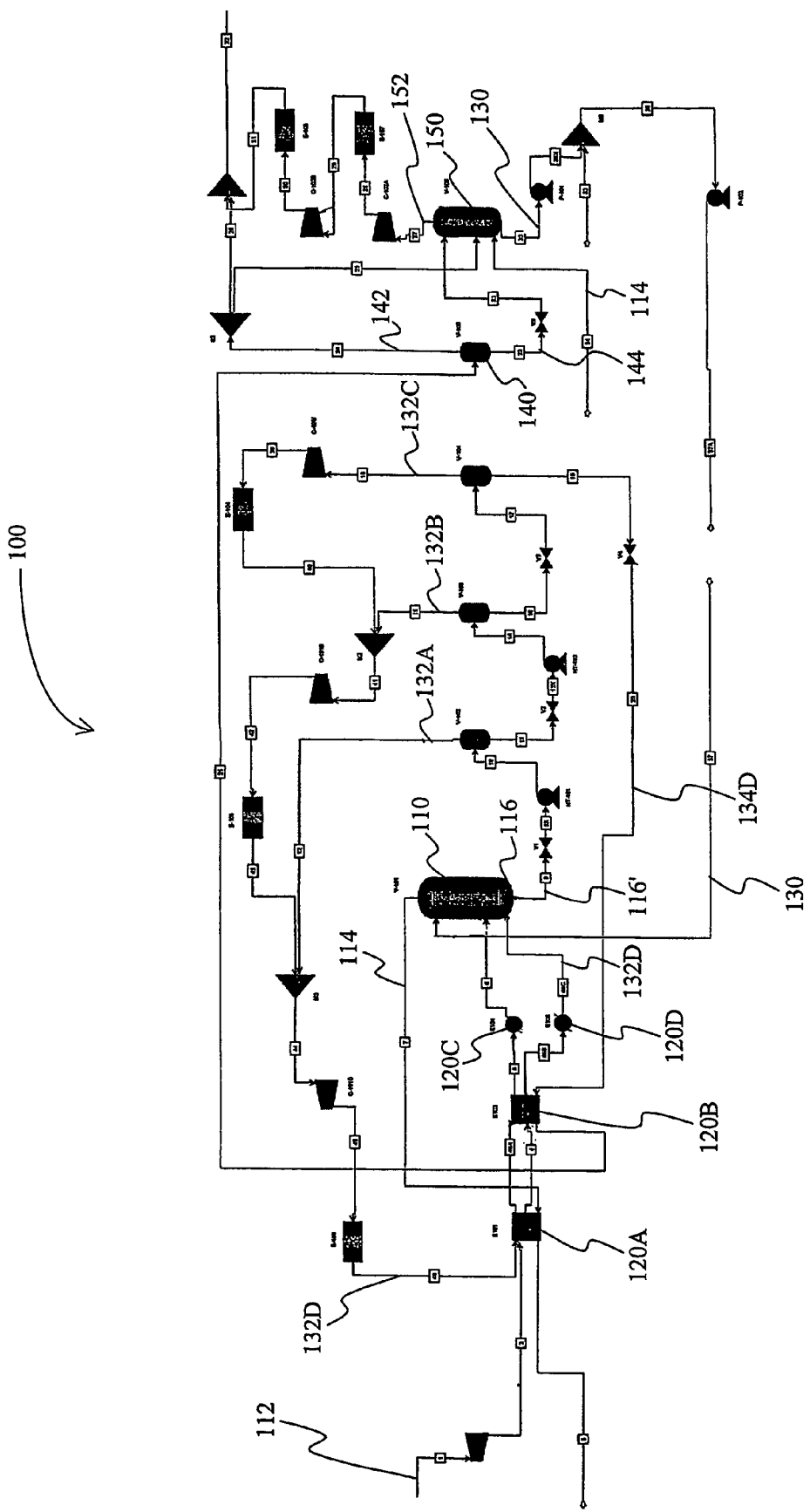
FIG. 1 is a schematic view of an exemplary acid gas removal plant according to the inventive subject matter.

The inventors unexpectedly discovered that the solvent circulation rate can be significantly reduced when at least a portion of the recycle gas is directly fed into the rich solvent instead of being fed into or combined (or mixed) with feed gas stream, and/or when at least a portion of an (preferably) atmospheric flash gas and a portion of the sweet gas are separately fed into the vacuum stripper such that the flash gas is used as a stripping gas to strip hydrogen sulfide from the rich solvent, and such that the sweet gas is used as a stripping gas to strip carbon dioxide from the rich solvent.

An exemplary configuration for a gas treatment plant according to the inventive subject matter is depicted in FIG. 1 in which plant 100 has an absorber 110 that receives a feed gas 112 and produces sweet gas 114. Where appropriate, feed gas 112 is expanded to absorber pressure and cooled in heat exchangers 120A and 120B, and cooler 120C before entering absorber 110. Lean solvent 130 enters the absorber and absorbs in counter-current fashion the acid gas (or acid gases) contained in the feed gas 112. The so formed rich solvent 116 is then contacted in the bottom of the absorber 110 with recycle gas 132D, which has been cooled in cooler 120D and heat exchangers 120A and 120B against the sweet gas 114 and flashed enriched rich solvent 134D, respectively. It should be particularly noted that contacting the rich solvent with the recycle gas will result in significantly increased solvent loading with the acid gases, and thereby reduce the solvent circulation rate.

The so further enriched rich solvent 116' is then flashed in three successive stages, wherein the flash vapors 132A, 132B, and 132C are combined (using suitable compression and cooling) to form recycle gas 132D, while the flashed enriched rich solvent 116' is further flashed to about atmospheric pressure and (after extraction of its refrigerant content) separated in flash drum 140 into atmospheric flash vapor 142 and atmospheric flash rich solvent 144.

Regenerator 150 operates as a vacuum stripper that receives the atmospheric flashed rich solvent 144 and produces the lean solvent 130. The acid gases 152 leave the regenerator 150 and are compressed and cooled for further use. In particularly preferred configurations, the stripper 150 is configured such that the atmospheric flash vapor 142 enters the stripper as a stripping gas separately from and at a position above the sweet gas 114, which is also employed as a stripping gas. It should be especially appreciated that in such configurations, the carbon dioxide in the atmospheric flash vapor 142 will strip hydrogen sulfide from the rich solvent, while the sweet gas 114 will strip the carbon dioxide from the rich solvent. Such configurations have been demonstrated to significantly reduce the solvent circulation rate (infra).

It is generally contemplated that the configurations and methods presented herein need not necessarily be limited to a gas treatment plant for natural gas processing, and it should be appreciated that numerous alternative plants may incorporate one or more inventive features as depicted and described herein. For example, contemplated solvent usage and regeneration schemes may be employed in numerous plants that remove carbon dioxide and/or hydrogen sulfide from processed or unprocessed natural gas or various refinery gases. Furthermore, contemplated configurations may also be employed where solutes other than (but not necessarily excluding) carbon dioxide and/or hydrogen sulfide are removed from a high-pressure gas using a physical solvent or solvent comprising a physical solvent.

Consequently, the source, composition, and/or pressure of suitable feed gases may vary substantially. However, it is generally contemplated that appropriate feed gases will comprise at least one acid gas component (e.g., carbon dioxide, hydrogen sulfide, etc.), and will have a pressure of at least 50 psig, more preferably at least 100 psig, even more preferably at least 500 psig, and most preferably at least 2000 psig. Furthermore, depending on the particular source of the feed gas, the type and concentration of the acid gas may vary substantially.

For example, where the feed gas source is a natural gas from a formation, carbon dioxide may be present in a concentration of up to 15% (and even higher where EOR is practiced), and hydrogen sulfide may be present in a concentration of up to 100 ppmv (or more). Other predominant components are typically hydrocarbon compounds, but also inert compounds, including $N_2$, He, etc., or $O_2$. Therefore, exemplary feed gases include processed (e.g., dehydrated, or $C5^+$-depleted) and unprocessed natural gas, refinery gases, gases for cryogenic separation, etc., which may typically be processed at a flow rate of several 100000 SCFD to up to several trillion SCFD. Still further, it is contemplated that the feed gas may be pretreated, and contemplated pretreatments include at least partial removal of a component that would otherwise interfere with the absorption and/or regeneration process (e.g., components that would condense, freeze, or react with the solvent), or at least partial removal of an undesirable component that would otherwise be removed after the gas treatment process in contemplated configurations.

With respect to the absorber, it is generally contemplated that all known types of absorbers may be employed in conjunction with the teachings presented herein, and it should be recognized that the particular type of absorber will at least in part depend on the particular composition, flow rate, pressure, and/or temperature of the feed gas. However, it is typically preferred that the absorber is a trayed absorber with at least eight, and more preferably ten (or more) equilibrium stages. Typical operating pressures will be at least 100 psig, more typically at least 500 psig, even more typically at least 1000 psig, and most typically 2000 psig, with flow rates of between about several 100000 SCFD to several trillion SCFD of feed gas.

Where the recycle gas is mixed with the rich solvent at the bottom of the absorber, it is generally preferred that the feed point of the recycle gas into the absorber is at a location which is at least one equilibrium stage separated and below from the location where the cooled feed gas enters the absorber. As the volume of the recycle gas is relatively low (compared to the volume of the cooled feed gas), it is generally preferred that the recycle gas is directly sparged to the rich solvent to ensure proper mass transfer. However, all other known gas feeding devices that will ensure sufficient mass transfer are also deemed suitable herein. For example, the recycle gas may contact the rich solvent in the column in a co-current or counter-current manner, and may be sparged into the rich solvent or an impeller or other mixing device may assist in the contact.

Of course, it should be recognized that the contact of the recycle gas with the rich solvent need not necessarily be limited to contacting the rich solvent with the recycle gas within the absorber (typically the bottom portion). Therefore, alternatively or additionally, it is contemplated that one or more static mixers or other mixing devices that is separate from the absorber may be used to contact the rich solvent with the recycle gas, and where desirable, a flash stage may be included in such configurations. Still further, while not preferred, it is also contemplated that at least a portion of the recycle gas may be fed to the rich solvent at a point downstream of a first flash vessel (e.g., into a flashed rich solvent stream).

It is generally preferred that the recycle gas is provided by the vapor product of at least one, and more typically all of the flash drums that are used to flash the rich solvent, wherein the flash drums sequentially receive rich solvent from the absorber or an upstream flash vessel. However, in a less preferred aspect, it is also contemplated that at least some of the flashed vapors may also be at least temporarily admixed to the feed gas (e.g., where the feed gas has a relatively high acid gas concentration). Depending on the amount of acid gas in the recycle gas, it is generally preferred that the recycle gas is cooled in one or more steps before contacting the rich solvent. While all known manners of cooling the recycle gas are contemplated, it is generally preferred that the recycle gas is cooled using a cooler, wherein the refrigeration content is preferably provided from a source within the gas treatment plant (e.g., cold sweet gas, or cold atmospheric flashed rich solvent). Especially preferred cooling configurations include those in which multiple recycle gas streams are combined to a single recycle gas stream having a pressure that is substantially identical (e.g., +/−10%) with the absorber pressure, and wherein each of the multiple recycle gas streams is individually cooled in a series of heat exchangers, and/or in which the single (combined) recycle gas stream is cooled in a single heat exchanger. Alternatively or additionally, cooling may also be provided to the rich solvent after contacting the recycle gas using a cooler, or heat exchanger.

In still further contemplated aspects of the inventive subject matter, the recycle gas may comprise (or may even be entirely replaced by) an additional gas stream that includes significant quantities of an acid gas (e.g., more than in the feed gas, and typically at least 2%), wherein that additional gas stream may be any gas stream other than the feed gas (e.g., compressed flue gases, or other carbon dioxide containing gas streams, including catalyst regenerator gases)

Suitable solvents include all physical solvents and mixtures comprising same, wherein the solvent may further exhibit selectivity towards specific acid gases. Therefore, especially preferred physical solvents include propylene carbonate, methyl cyanoacetate, dimethyl ether of polyethyleneglycol, N-methyl 2-pyrrolidone and methanol. After flashing the rich solvent to extract at least a portion of the non-acid gas vapors in the rich solvent, it is generally preferred to flash the rich solvent to atmospheric pressure to thereby create an atmospheric flash gas enriched in acid gas and an atmospheric flashed rich solvent. The term "atmospheric flash gas" as used herein refers to a gas that is produced from the rich solvent by flashing the rich solvent to a pressure of between about 12 and 17 psia. Similarly, the term "atmospheric flashed rich solvent" as used herein refers to a solvent that is produced from the rich solvent by flashing the rich solvent to a pressure of between about 12 and 17 psia.

In most instances, and further depending on the particular pressure, the atmospheric flash gas is relatively rich in carbon dioxide. Therefore, it is generally preferred that at least one portion of the atmospheric flash gas is fed into the regenerator as a stripping gas for hydrogen sulfide, while another portion may be employed for further use of the acid gas (e.g., recompression and sequestration to a formation, carbon dioxide liquefaction, and/or feeding to a Clauss process, etc.). It should be particularly noted that the atmospheric flash gas is preferably not combined with the sweet gas to form a stripping gas in the vacuum stripper, but will be fed to the stripper separated by at least one, and more preferably two or more equilibrium stages above the position where the sweet gas enters the regenerator. Therefore, it should be recognized that the carbon dioxide in the atmospheric flash gas acts as a stripping gas for hydrogen sulfide, while the sweet gas acts as a stripping gas for the carbon dioxide.

Consequently, preferred regenerators are typically operated as vacuum strippers, and all known vacuum stripper configurations are deemed suitable for use herein, so long as at least part of the atmospheric flash gas and the sweet gas are separately introduced into the stripper (supra). Where desirable, an auxiliary heater may be thermally coupled to the stripper to assist stripping. Furthermore, it should be recognized that at least a portion of the sweet gas may be replaced by any other suitable stripping gas, especially those available at the gas treatment plant (e.g., nitrogen, air, or other suitable gas). The so separated acid gases from the stripper may then be used for further separation or proper disposal.

With respect to the piping, pumps, valves, flash vessels, heat exchangers, coolers, compressors, expanders, and other equipment not mentioned above, it should be appreciated that contemplated configurations may generally be constructed using conventional materials and components well know to a person of ordinary skill in the art.

Thus, the inventors generally contemplate a plant in which acid gas is removed from a feed gas in an absorber using a physical solvent to produce a rich solvent, wherein the rich solvent is contacted with a recycle gas that is produced from the rich solvent. In one preferred aspect, suitable gas treatment plants may therefore include a contact vessel in which a rich solvent from an absorber contacts a recycle gas, wherein the recycle gas is produced from the rich solvent, and wherein the absorber receives a feed gas from which an acid gas is removed using a physical solvent, thereby producing the rich solvent.

Thus, contemplated gas treatment plants will comprise a flash vessel that produces an atmospheric flash gas comprising a first acid gas and a flashed rich solvent comprising a second acid gas, and a vacuum stripper fluidly coupled to the flash vessel and producing a lean solvent from the flashed rich solvent, wherein the atmospheric flash gas and a sweet gas are fed into the vacuum stripper at a position such that (a) the first acid gas strips the second acid gas from the flashed rich solvent and (b) the sweet gas strips the first acid gas from the rich solvent.

EXAMPLES

A computer simulation was performed on an exemplary gas treatment plant with a configuration substantially as depicted in FIG. 1. In the "Base" case, the feed gas was high-pressure natural gas and was processed at an absorber pressure of about 2500 psig, wherein the absorber had ten equilibrium stages. The vacuum stripper had six equilibrium stages. The gas treatment plant was configured to remove carbon dioxide from about 12 mol % to about 1.5 mol %, and hydrogen sulfide from about 90 ppmv to less than about 4 ppmv at a feed gas flow rate of 1.6 trillion SCFD with about 17000 gpm of lean polypropylene carbonate as physical solvent.

One modification to this process configuration is referred to in the table below as "Case 1", which is identical to the Base case, with the exception that the vacuum stripper has four equilibrium stages plus one stage below the feed location of the carbon dioxide rich stripping gas (i.e., the atmospheric flash vapor), wherein a portion of the sweet gas from the absorber is fed to the vacuum stripper at the bottom of the regenerator (i.e., below the feed of the atmospheric flash vapor). The flow rates of the carbon dioxide rich gas and the sweet gas are identical to those of the Base case. Such a configuration had a reduction in solvent circulation of about 3%.

Another modification to the Base case is a process configuration referred to in the table below as "Case 2", which is identical to the Base case, with the exception that one additional stage is added to the absorber below the feed of the cooled feed gas, and that the recycle gas was fed to the bottom of the absorber. Such a configuration had a reduction in solvent circulation of about 2.7%.

A further modification to the Base case is a process configuration referred to in the table below as "Case 3", which is identical to Case 1, with the exception that one additional stage is added to the absorber below the feed of the cooled feed gas, and that the recycle gas was fed to the bottom of the absorber. Such a configuration had a reduction in solvent circulation of about 5.3%.

A still further modification to the Base case is a process configuration referred to in the table below as "Case 4", which is identical to Case 3, with the exception that the vacuum stripper has four equilibrium stages plus two stages below the feed location of the carbon dioxide rich stripping gas (i.e., the atmospheric flash vapor), wherein a portion of the sweet gas from the absorber is fed to the vacuum stripper at the bottom of the regenerator (i.e., below the feed of the atmospheric flash vapor). Such a configuration had a reduction in solvent circulation of about 7.1%. Common to all of Cases 1-4 is besides a reduction in solvent circulation a moderate improvement in the recovery of C3 and C4 components from the feed gas and an additional reduction of hydrogen sulfide in the sweet gas. Further process details are provided in the tables below.

| CASE | ABSORBER Stages (N) | ABSORBER Mixer (N) | STRIPPER Stages (N) | STRIPPER Mixer (N) | LEAN SOLVENT Rate Lb mol/hr | LEAN SOLVENT Mole Fraction C1 | LEAN SOLVENT Mole Fraction CO2 | LEAN SOLVENT Mole Fraction H2S |
|---|---|---|---|---|---|---|---|---|
| Base | 10 | 0 | 6 | 0 | 105300 | 2.5 E-5 | 5.5 E-3 | 1.3 E-5 |
| 1 | 10 | 0 | 4 | 1 | 102247 | 9.5 E-5 | 2.6 E-3 | 1.2 E-5 |
| 2 | 10 | 1 | 4 | 0 | 102500 | 2.5 E-5 | 5.5 E-3 | 1.5 E-5 |
| 3 | 10 | 1 | 4 | 1 | 100000 | 9.5 E-5 | 2.6 E-3 | 1.2 E-5 |
| 4 | 10 | 1 | 4 | 2 | 98300 | 1.2 E-4 | 1.5 E-3 | 1.1 E-5 |

| CASE | ABSORBER Stages (N) | ABSORBER Mixer (N) | STRIPPER Stages (N) | STRIPPER Mixer (N) | SWEET GAS Rate Lb mol/hr | SWEET GAS Mole Fraction C1 | SWEET GAS Mole Fraction C2 | SWEET GAS Mole Fraction C3 | SWEET GAS Mole Fraction C4 | SWEET GAS Mole Fraction CO2 | SWEET GAS Mole Fraction H2S |
|---|---|---|---|---|---|---|---|---|---|---|---|
| Base | 10 | 0 | 6 | 0 | 162450 | 0.895 | 0.60 | 0.0198 | 0.028 | 0.01499 | 2.5 ppm |
| 1 | 10 | 0 | 4 | 1 | 162472 | 0.895 | 0.60 | 0.0198 | 0.028 | 0.01496 | 2.3 ppm |
| 2 | 10 | 1 | 4 | 0 | 162480 | 0.895 | 0.60 | 0.0201 | 0.029 | 0.01479 | 2.8 ppm |
| 3 | 10 | 1 | 4 | 1 | 162440 | 0.895 | 0.60 | 0.0201 | 0.029 | 0.01439 | 2.1 ppm |
| 4 | 10 | 1 | 4 | 2 | 162520 | 0.895 | 0.60 | 0.0201 | 0.029 | 0.01479 | 2.1 ppm |

| CASE | COMPRESSOR | | PUMP | |
|---|---|---|---|---|
| | Total (HP) | % Base Case (HP) | Total (HP) | % Base Case (HP) |
| Base | 6519 | 100 | 14816 | 100 |
| 1 | 6449 | 98.8 | 14347 | 96.8 |
| 2 | 6362 | 97.6 | 14357 | 96.9 |
| 3 | 6376 | 97.8 | 13971 | 94.3 |
| 4 | 6243 | 95.8 | 13714 | 92.6 |

Thus, specific embodiments and applications of improved configurations for solvent use and regeneration have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A gas treatment plant comprising an absorber in which acid gas is removed from a feed gas using a physical solvent to thereby produce a rich solvent, wherein the rich solvent is contacted with a recycle gas at a location downstream of a position where the feed gas enters the absorber, and wherein the recycle gas is produced from the rich solvent, wherein the rich solvent is flashed in a flash vessel to produce an atmospheric flashed rich solvent that is fed into a vacuum stripper to produce lean solvent, and wherein the vacuum stripper separately receives as a stripping gas a sweet gas produced by the absorber and atmospheric flash gas from the flash vessel.

2. The gas treatment plant of claim 1 wherein the feed gas comprises natural gas at a pressure of at least 2000 psig, and wherein the acid gas is at least one of hydrogen sulfide and carbon dioxide.

3. The gas treatment plant of claim 1 wherein the recycle gas is produced from flashed gases of a plurality of serially coupled flash vessels, and wherein the recycle gas is compressed to absorber pressure.

4. The gas treatment plant of claim 1 wherein the rich solvent is contacted with the recycle gas in the bottom portion of the absorber.

5. The gas treatment plant of claim 1 wherein the rich solvent is contacted with the recycle gas in a static mixer outside the absorber.

6. A gas treatment plant comprising a contact vessel in which a rich solvent that is formed in an absorber contacts a recycle gas, wherein the recycle gas is produced from the rich solvent, wherein the absorber receives a feed gas from which an acid gas is removed using a physical solvent, thereby producing the rich solvent, wherein an atmospheric flash vessel is configured to produce from flashed rich solvent of the plurality of sequentially coupled flash vessels an atmospheric flashed solvent that is fed into a regenerator to produce a lean solvent for the absorber, wherein the atmospheric flash vessel further produces an atmospheric flash gas, wherein the absorber produces a sweet gas, wherein the regenerator is a vacuum stripper, and wherein at least a portion of the sweet gas and at least a portion of the atmospheric flash gas are separately fed into the regenerator as a stripping gas.

7. The gas treatment plant of claim 6 wherein the feed gas comprises natural gas at a pressure of at least 2000 psig, and wherein the acid gas is at least one of hydrogen sulfide and carbon dioxide.

8. The gas treatment plant of claim 6 wherein the contact vessel comprises a static mixer, and wherein the contact vessel is fluidly coupled to a flash vessel.

9. The gas treatment plant of claim 6 wherein the rich solvent is flashed downstream of the contact vessel in a plurality of sequentially coupled flash vessels, wherein each of the flash vessels produces a portion of the recycle gas.

10. The gas treatment plant of claim 6 wherein the regenerator is configured such that carbon dioxide in the atmospheric flash gas strips hydrogen sulfide from the flashed rich solvent, and that the at least portion of the sweet gas strips the carbon dioxide from the flashed rich solvent.

11. A gas treatment plant comprising:
a flash vessel that produces an atmospheric flash gas comprising a first acid gas and a flashed rich solvent comprising a second acid gas;
a vacuum stripper fluidly coupled to the flash vessel and producing a lean solvent from the flashed rich solvent; and
wherein the atmospheric flash gas and a sweet gas are fed into the vacuum stripper at a position such that (a) the first acid gas strips the second acid gas from the flashed rich solvent and (b) the sweet gas strips the first acid gas from the rich solvent.

12. The gas treatment plant of claim 11 wherein the first acid gas is carbon dioxide, and wherein the second acid gas is hydrogen sulfide.

13. The gas treatment plant of claim 11 wherein the flash vessel receives a rich solvent from an absorber, wherein the rich solvent is contacted with a recycling gas before the rich solvent enters the flash vessel.

14. The gas treatment plant of claim 13 wherein the recycling gas is produced in another flash vessel that is upstream fluidly coupled of flash vessel and downstream fluidly coupled to the absorber.

15. The gas treatment plant of claim 13, further comprising a contact vessel in which the rich solvent contacts the recycling gas.

16. The gas treatment plant of claim 13 wherein the absorber receives a feed gas at a pressure of at least 2000 psig, and wherein the feed gas comprises a natural gas.

17. A gas treatment plant comprising a contact vessel in which a rich solvent that is formed in an absorber contacts a recycle gas, wherein the recycle gas is produced from the rich solvent, wherein the absorber receives a feed gas from which an acid gas is removed using a physical solvent, thereby producing the rich solvent, wherein the contact vessel comprises a static mixer, and wherein the contact vessel is fluidly coupled to a flash vessel.

\* \* \* \* \*